United States Patent
Ghosh

(10) Patent No.: US 7,239,242 B2
(45) Date of Patent: Jul. 3, 2007

(54) PARTS AUTHENTICATION EMPLOYING RADIO FREQUENCY IDENTIFICATION

(75) Inventor: Debabrata Ghosh, Beverly, MA (US)

(73) Assignee: Axcelis Technologies, Inc., Beverly, MA (US)

( * ) Notice: Subject to any disclaimer, the term of this patent is extended or adjusted under 35 U.S.C. 154(b) by 169 days.

(21) Appl. No.: 11/043,758

(22) Filed: Jan. 26, 2005

(65) Prior Publication Data

US 2006/0164246 A1 Jul. 27, 2006

(51) Int. Cl.
*G08B 23/00* (2006.01)

(52) U.S. Cl. ............................. 340/572.1; 340/572.41

(58) Field of Classification Search .. 340/568.1–572.9; 235/493, 494, 375; 700/108–244
See application file for complete search history.

(56) References Cited

U.S. PATENT DOCUMENTS

| | | | |
|---|---|---|---|
| 4,961,533 A | 10/1990 | Teller et al. | |
| 5,910,776 A | 6/1999 | Black | |
| 6,028,537 A | 2/2000 | Suman et al. | |
| 6,267,291 B1 * | 7/2001 | Blankenship et al. | 235/375 |
| 6,664,520 B2 | 12/2003 | Clothier | |
| 6,717,154 B2 | 4/2004 | Black et al. | |
| 6,736,316 B2 | 5/2004 | Neumark | |
| 6,784,787 B1 | 8/2004 | Atkins et al. | |
| 6,791,452 B2 | 9/2004 | Fletcher et al. | |
| 6,796,506 B1 | 9/2004 | Pradhan et al. | |
| 6,801,130 B2 | 10/2004 | Campero | |
| 7,042,346 B2 * | 5/2006 | Paulsen | 340/438 |
| 2002/0067263 A1 * | 6/2002 | Tafoya et al. | 340/572.1 |
| 2002/0186144 A1 | 12/2002 | Meunier | |
| 2003/0102970 A1 * | 6/2003 | Creel et al. | 340/568.1 |
| 2004/0143475 A1 | 7/2004 | Kilburn et al. | |
| 2004/0167465 A1 | 8/2004 | Mihai et al. | |
| 2004/0195342 A1 | 10/2004 | Silverbrook et al. | |
| 2005/0258241 A1 * | 11/2005 | McNutt et al. | 235/385 |
| 2006/0007003 A1 * | 1/2006 | Yamagiwa | 340/572.1 |
| 2006/0043177 A1 * | 3/2006 | Nycz et al. | 235/385 |

* cited by examiner

*Primary Examiner*—Benjamin C. Lee
*Assistant Examiner*—Jennifer Mehmood
(74) *Attorney, Agent, or Firm*—Eschweiler & Associates, LLC

(57) ABSTRACT

The present invention facilitates operation of systems by managing and authenticating components, including parts and subsystems, present within a system. The present invention includes RFID tags individually associated with the components of the system. The RFID tags generally include at least a part number and a serial number for the components. One or more readers are present and communicate with the RFID tags via a wireless communication medium. A controller generates interrogatory signals, receives response signals from the RFID tags, and employs the received response signals to authenticate the components.

18 Claims, 9 Drawing Sheets

PARTS AUTHENTICATION EMPLOYING RADIO FREQUENCY IDENTIFICATION

FIELD OF INVENTION

The present invention relates generally to parts authentication, and, more particularly, to parts authentication in ion implantation systems.

BACKGROUND OF THE INVENTION

Ion implantation systems are sophisticated systems that are employed in fabricating semiconductor devices including dynamic random memory devices (DRAM), flash memory, system on chip (SOC) devices, central processor units (CPU), and the like. Ion implantation systems are employed during semiconductor device fabrication to selectively implant ions and control device behavior in a process referred to as ion implantation. Ion implantation systems rely on proper performance of their constituent parts in order to properly perform ion implantation and, as a result, properly fabricate semiconductor devices.

Ion implantation is a physical process, as opposed to diffusion, which is a chemical process, employed in semiconductor device fabrication to selectively implant dopant into semiconductor and/or wafer material. Thus, the act of implanting does not rely on a chemical interaction between a dopant and the semiconductor material. For ion implantation, dopant atoms/molecules are ionized and isolated, sometimes accelerated or decelerated, formed into a beam, and swept across a wafer. The dopant ions physically bombard the wafer, enter the surface and come to rest below the surface.

An ion implantation system is a collection of sophisticated subsystems or parts, each performing a specific action on the dopant ions. Dopant elements, in gas or solid form, are positioned inside an ionization chamber and ionized by a suitable ionization process. In one exemplary process, the chamber is maintained at a low pressure (vacuum). A filament is located within the chamber and is heated to the point where electrons are created from the filament source. The negatively charged electrons are attracted to an oppositely charged anode also within the chamber. During the travel from the filament to the anode, the electrons collide with the dopant source elements (e.g., molecules or atoms) and create a host of positively charged ions from the elements in the molecule.

Generally, other positive ions are created in addition to desired dopant ions. The desired dopant ions are selected from the ions by a process referred to as analyzing, mass analyzing, selection, or ion separation. Selection is accomplished utilizing a mass analyzer that creates a magnetic field through which ions from the ionization chamber travel. The ions leave the ionization chamber at relatively high speeds and are bent into an arc by the magnetic field. The radius of the arc is dictated by the mass of individual ions, speed, and the strength of the magnetic field. An exit of the analyzer permits only one species of ions, the desired dopant ions, to exit the mass analyzer.

An acceleration system, referred to as a linear accelerator, is employed in some instances to accelerate or decelerate the desired dopant ions to a predetermined momentum (e.g., mass of an dopant ion multiplied by its velocity) to penetrate the wafer surface. For acceleration, the system is generally of a linear design with annular powered electrodes and pairs of quadruple lenses along its axis. The quadruple lenses are powered by negative and positive electrical potentials. As the dopant ions enter therein, they are accelerated therethrough by the powered electrodes and are (as a beam) selectively focused and defocused by the quadruple lenses.

Continuing on, the dopant ions are then directed towards a target wafer at an end station. The dopant ions, as a beam, impact the wafer with a beam intensity, which is a measure of the number of particles per unit time as a function of position, and emittance, which is an angular distribution (angle of incidence) of the beam as a function of position. Generally, it is desirable that the beam intensity and emittance be substantially uniform and at expected or desired values.

A number of problems, generally caused by faulty parts, can result causing ion implantation systems to improperly perform ion implantations. As a result of these problems, device lifetime and/or operability can be negatively impacted. Performance of parts can degrade over time and/or use thereby causing performance of the ion implantation system to degrade. Additionally, improper parts can be employed in the ion implantation systems also causing performance of the ion implantation system to degrade. For example, a faulty pump employed to create a vacuum in an ionization chamber can degrade ion creation. As another example, improper parts or components employed in the acceleration system can result in improper energy levels being obtained for a generated ion beam.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates semiconductor device fabrication and ion implantation by providing systems and methods for managing and/or authenticating components present within a system. The present invention includes systems and methods that seek signals from components, including subsystems and/or parts, before, during, and after operation. RFID tags are associated with the components and provide the signals, which are then employed to authenticate the components within the system. The systems and methods then operate according to whether the components are authenticated or not. Additionally, the RFID tags can also be employed with the present invention to identifying components, manage components within a system, track part/component usage, and the like.

The present invention facilitates operation of systems by managing and authenticating components, including parts and subsystems, present within a system. The present invention includes RFID tags individually associated with the components of the system. The RFID tags generally store and transmit at least a part number and a serial number for the components. One or more readers are present and communicate with the RFID tags via a wireless communication medium. A controller generates interrogatory signals, receives response signals from the RFID tags, and employs the received response signals to authenticate the components.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
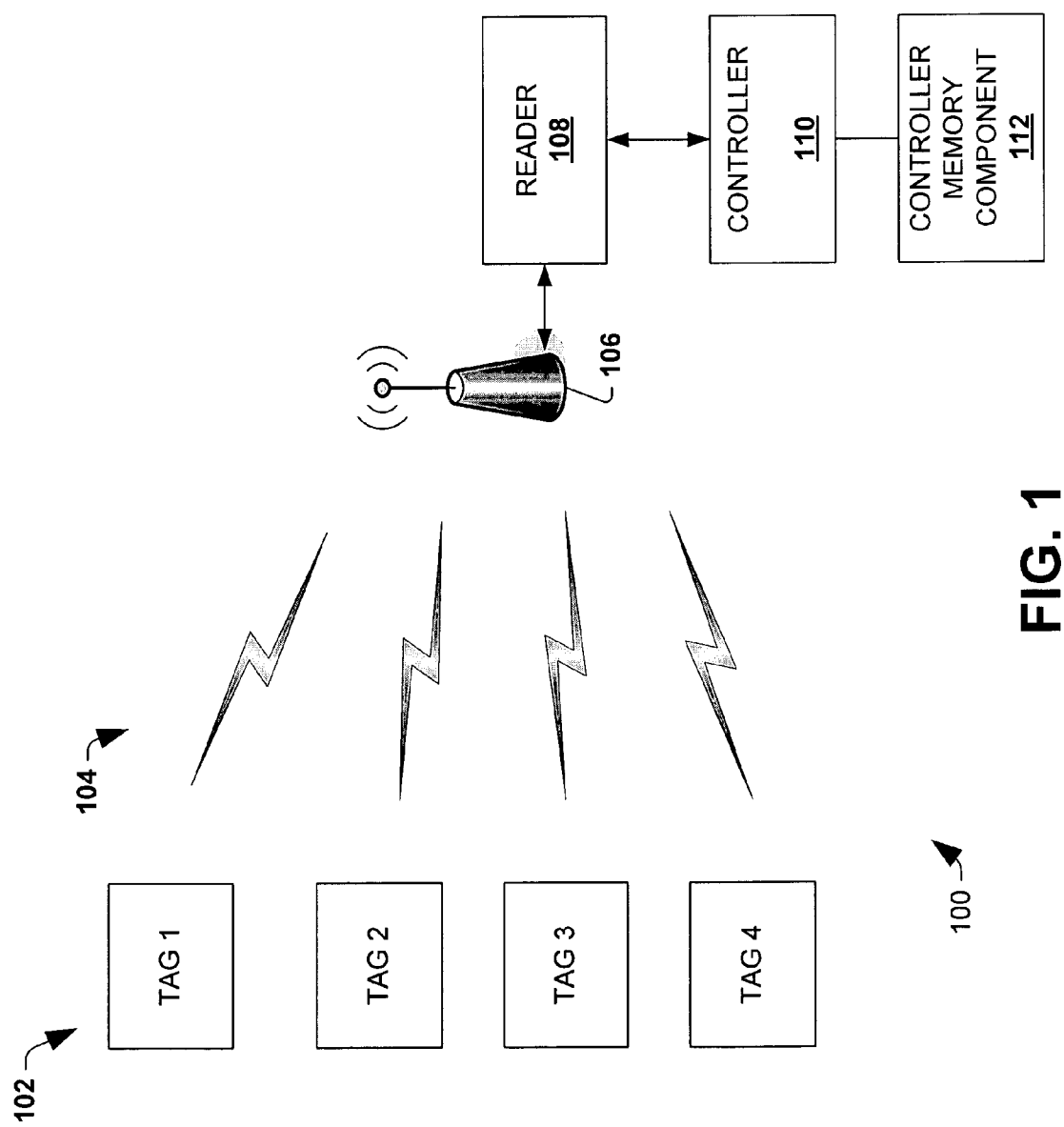
FIG. 1 is a diagram illustrating a parts authentication system in accordance with an aspect of the present invention.

The present invention will now be described with reference to the attached drawings, wherein like reference numerals are used to refer to like elements throughout. It will be appreciated by those skilled in the art that the invention is not limited to the exemplary implementations and aspects illustrated and described hereinafter.

The present invention facilitates ion implantation systems and other systems by automatically detecting components, including parts and subsystems, employed in a system. The present invention can allow operation of the ion implantation system, operate in a safe mode, or prevent operation according to the detected components. Furthermore, the present invention can track performance and components employed in a system and identify components that degrade performance and recommend adjustments and/or replacement.

The present invention facilitates operation of systems by managing and authenticating components, including parts and subsystems, present within a system. The present invention includes RFID tags individually associated with the components of the system. The RFID tags generally store and/or transmit at least a part number and a serial number for the components. One or more readers are present and communicate with the RFID tags via a wireless communication medium. A controller generates interrogatory signals, receives response signals from the RFID tags, and employs the received response signals to authenticate the components.

FIG. 1 is a diagram illustrating a parts authentication system 100 in accordance with an aspect of the present invention. The system can, for example, be employed with an ion implantation system to authenticate parts present within the system.

The system 100 includes tags 102, a wireless communication mechanism 104, an antenna 106, a reader 108, and a controller 110. The tags 102 are radio frequency identification (RFID) tags and are associated with individual components, including parts and subsystems. The tags 102 respectively include a memory component that stores data or information related to the tag and an associated component, which is a component, including parts and/or subsystems, of the system 100.

The memory component maintains information about the associated component such as, but not limited to, part number, serial number, and the like. Some of this component information is read only while other portions can be read/write. For example, the memory component can maintain some information as read only, such as component name, part number, serial number, date of manufacture, component operational lifetime, manufacturer, and the like. As another example, the memory component can maintain some information as read/write, such as installation date, usage information, service/repair record, and the like. In addition to the component information, the memory component can also store and maintain security information, transponder operating instructions, internal management functions, frequency assignments, response delay timings, data flow control, power supply settings, and the like.

The memory component is comprised of one or more memory devices such as read-only memory (ROM), random access memory (RAM), erasable programmable read only memory (EEPROM), non-volatile memory (e.g., flash memory), volatile memory, and the like. Additionally, the memory component typically includes data buffers that temporarily hold incoming data following demodulation and outgoing data form modulation and that interface with an antenna of the respective tags. The tags 102 also generally include interface circuitry that provides facility to direct and accommodate an interrogation field energy in passive tags and triggering of the response to received signals. The interface circuitry, in response to a received signal, generates an appropriate response and provides it to the antenna. The generated response can include component information, such as described above, and/or information about the tag itself. For example, the response can include tag specific information including power mechanism, data carrying options, data read rates, programming options, physical form, costs, and the like.

In addition to the above, the tags 102 require power to operate. Typically, this power is relatively small and in the micro to milliwatts range. The tags 102 are either passive tags or active tags, wherein active tags are powered by an internal battery or power source and passive tags operate without an internal power source and derive power from a field generated by the reader 106. Active tags have a limited lifetime due to their internal power source. However, the lifetime can be 10 or more years, depending upon operating temperatures, read/write cycles and usage. Passive tags generally have an unlimited lifetime due to their lack of power source and also have the advantage being relatively smaller, lighter, and lower cost than active tags. The tags 102 of the present invention can also be combination active and passive tags in which the tags 102 include an internal power source for active operation and are also able to operate in passive mode to extend operational lifetime.

The wireless communication mechanism 104 permits communication between the reader 108 and the tags 102. The communication mechanism 104 can include propagating electromagnetic waves and/or inductive coupling in order to permit wireless communication. Generally, the communication mechanism is generated by the reader 108 for passive tags and by both the reader 108 and the tags 102 for active tags and allows for interrogatory signals to travel from the reader 108 to the tags 102 and for response signals to travel from the tags 102 to the reader.

The antenna 106 is present and coupled to the reader 108 to provide generated interrogatory signals to the wireless communication mechanism 104 and to receive response signals from the tags 102 via the communication mechanism 104.

The reader 108 generates the interrogatory signals and provides them to the antenna 106 in order to obtain desired component and/or tag information. The interrogatory signals can, for example, request component information such as part number, serial number, and the like. Further, the interrogatory signals can, for example, request tag information such as data rate, protocols used, and the like. Additionally, the interrogatory signals can write information to one or more of the tags 102, if the tags 102 are so operable.

A typical interrogatory signal includes a tag identifier, which can be a single tag or all available tags, information to be provided by the tag, and/or information to be written to the tag. The information can include field and data components for proper use by the tags 102.

The system 100 generally has three modes of operation that are controlled by the controller 110, initialization or startup, normal operation, and termination. During initialization mode, the controller 110 causes the reader 108 to send one or more interrogatory signals requesting identification from the tags 102 via the antenna 106 and the wireless communication medium 104. The interrogatory signals may be sent in multiple frequency ranges in order to account for tags that operate in different frequency ranges. The controller 110 may not have knowledge of components and the tags 102 present within the system. The tags 102 respond with signals that include component information and tag information. The controller 110 then determines components within the system, determines if components have been uninstalled from the system 100, and determines if components have been installed to the system 100 and stores this information in a controller memory component 112. The information from the controller memory component 112 can be referenced by the controller 110 in order to determine installed and/or uninstalled components. The controller 110 can send signals to the tags updating their component information with, for example, usage updates, dates installed, and the like.

During normal mode, the controller 110 periodically polls the tags 102 to reaffirm their presence and operation within the system 100. If an error is identified, the controller 110 can perform corrective action including shutting down the system, operating in a limited capacity, requesting service and/or replacement of affected components, and the like. During termination mode, the controller 110 sends interrogatory signals that include updated component information, such as usage information. Other special modes, including programming modes, can also be present and employed within the system 100 in accordance with the present invention.

Figure 2:
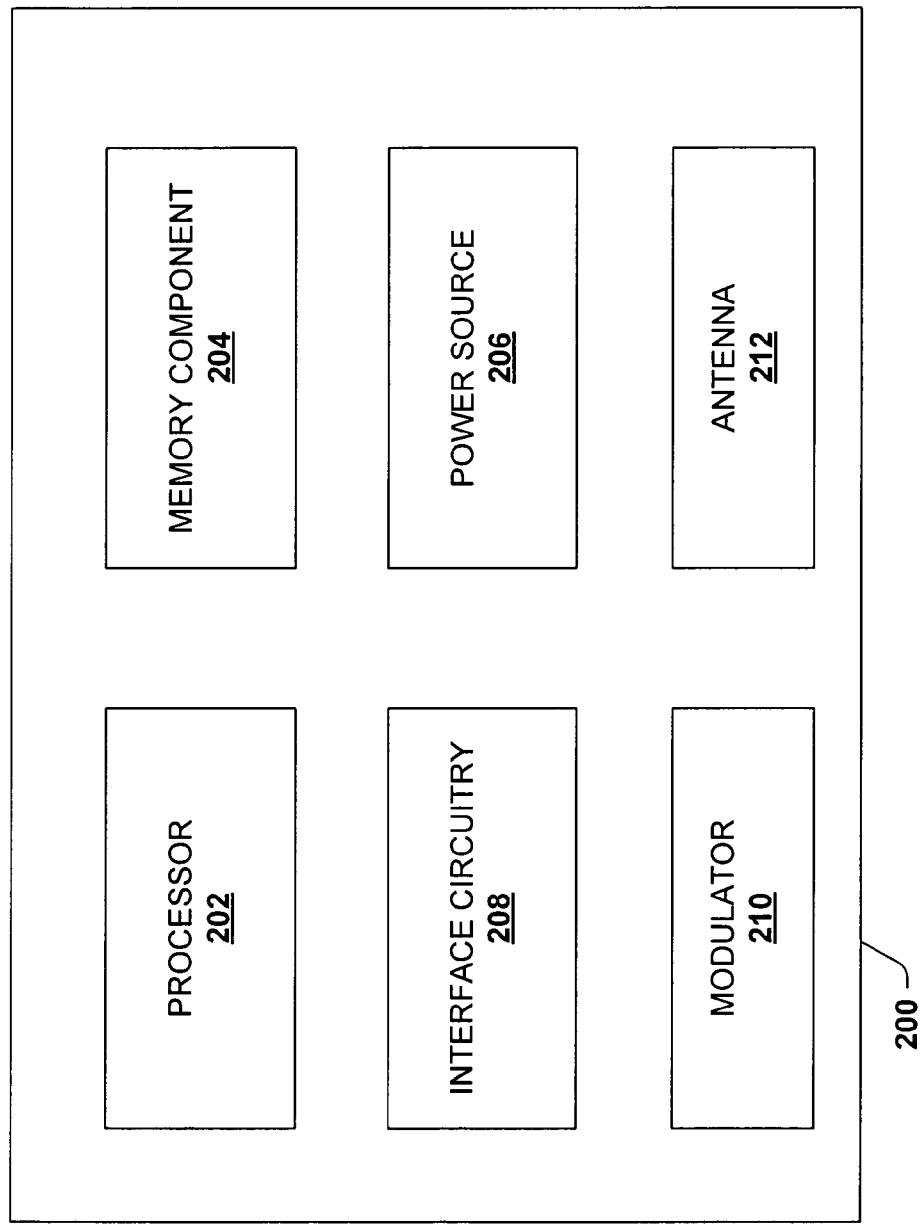
FIG. 2 is a block diagram illustrating an RFID tag in accordance with an aspect of the present invention.

FIG. 2 is a block diagram illustrating an RFID tag 200 in accordance with an aspect of the present invention. The tag 200 can be employed in systems such as the system 100 of FIG. 1, described above, and other systems and methods described below. Generally, the tag 200 is operable to wirelessly receive interrogatory signals from a reader, process the received signals, and respond with response signals to the reader.

The tag 200 comprises a processor or controller 202, which executes program code, a memory component 204, a power source 206, interrogation circuitry 208, a modulator/demodulator 210, and an antenna 212. Other suitable components as well as variations of the above components can also be included and present within the tag 200. The processor 202 controls operation of the tag and executes program code stored in the memory component 204. As such, the processor 202 is responsible for generating appropriate responses to received signals and storing received information. Additionally, the processor 202 can encrypt outgoing signals and decrypt incoming signals using security information stored within the memory component. Operation and performance of the tag 200 can be adjusted by altering the program code stored in the memory component 204.

The memory component 204 stores and maintains information content including, but not limited to, program code, component information, security information and tag information. As stated above, the program code controls operation of the tag 200. The component information includes information related to a component associated with the tag 200 including, but not limited to, part number, serial number, and the like. Some of this component information is read only while other portions can be read/write. For example, the memory component 204 can maintain some information as read only, such as component name, part number, serial number, date of manufacture, component operational lifetime, manufacturer, and the like. As another example, the memory component 204 can maintain some information as read/write, such as installation date, usage information, service/repair record, and the like. The security information includes information that facilitates authentication including, but not limited to, private keys, public keys, encoding and decoding algorithms, keywords, and the like. The tag information includes information specific to the tag 200, such as, internal management functions, frequency assignments, response delay timings, data flow control, power supply settings, and the like.

The memory component 204 is comprised of one or more memory devices such as read-only memory (ROM), random access memory (RAM), erasable programmable read only memory (EEPROM), non-volatile memory (e.g., flash memory), volatile memory, and the like. Additionally, the memory component 204 can include data buffers that temporarily hold incoming data from the modulator 210 following demodulation and outgoing data to the modulator 210 for modulation and that interface with the antenna 212.

The interface circuitry 208 provides facility to direct and accommodate an interrogation field energy in passive tags and triggering of the response to received signals. The interface circuitry 208, in response to a received signal, generates an appropriate response 208 and provides it to the modulator 210 for modulation and the antenna 212. The generated response can include component information, such as described above, and/or information about the tag

200 itself. For example, the response can include tag specific information including power mechanism, data carrying options, data read rates, programming options, physical form, costs, and the like.

The power source 206 is present if the tag 200 is active and is not present if the tag 200 is passive. The power source 206 supplies power to components of the tag 200 to allow operation of the tag 200. The antenna 212 sends response signals and receives interrogatory signals via a wireless communication medium.

Figure 3:
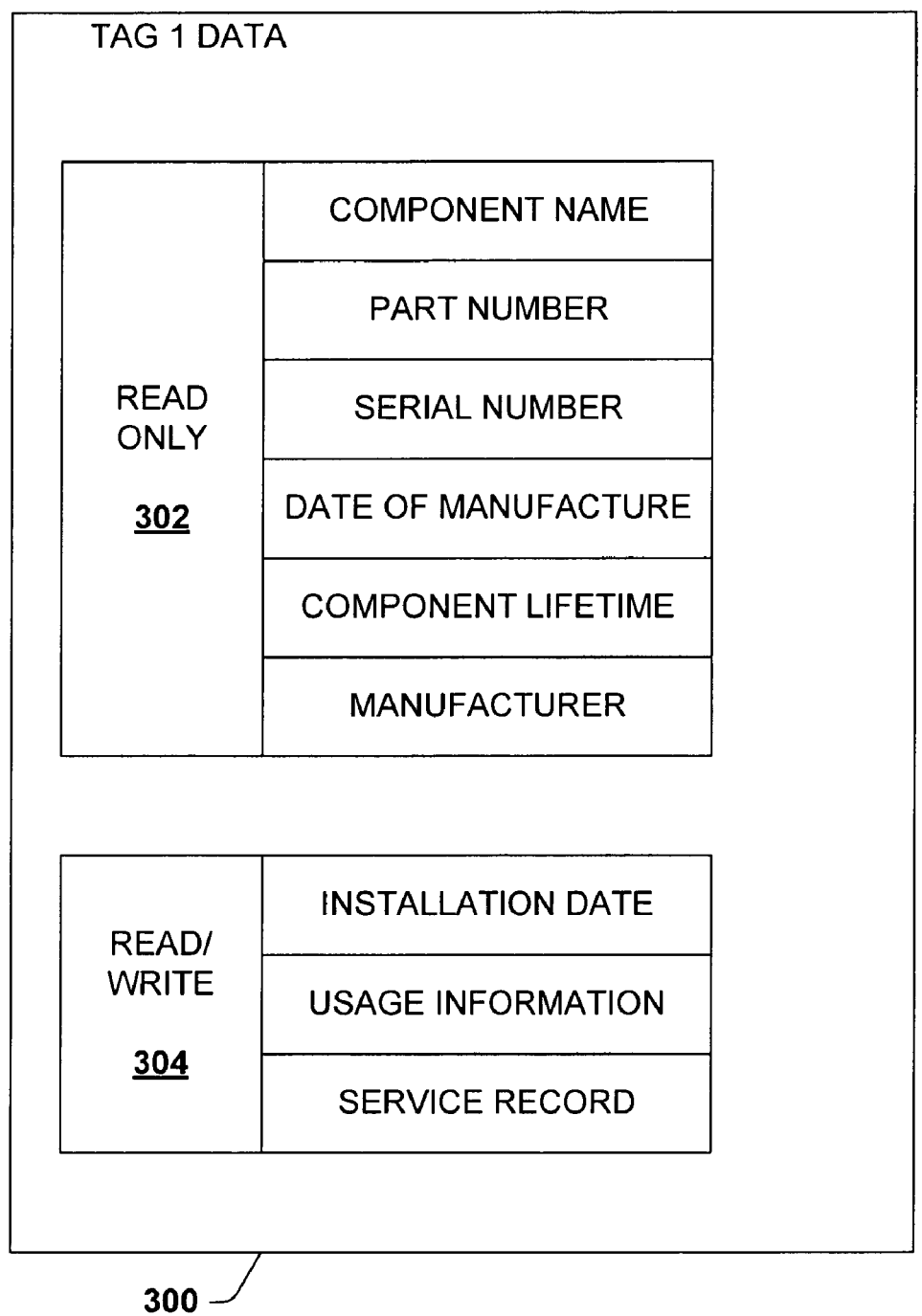
FIG. 3 is a block diagram illustrating types of information maintained in a RFID tag in accordance with an aspect of the present information.

FIG. 3 is a block diagram illustrating types of information maintained in a RFID tag 300 in accordance with an aspect of the present information. The types illustrated are exemplary in nature and are not intended to limit the present invention to specific types and/or amounts of information.

The information in the tag 300 typically includes read only information 302 and can also include read/write information 304. The read only information 302 generally provides component identification information such as, but not limited to, component name, part number, serial number, date of manufacture, component lifetime, manufacturer, and the like. The read/write information 304 generally comprises use of component information including, but not limited to, installation date, usage information, service record, and the like.

Figure 4:
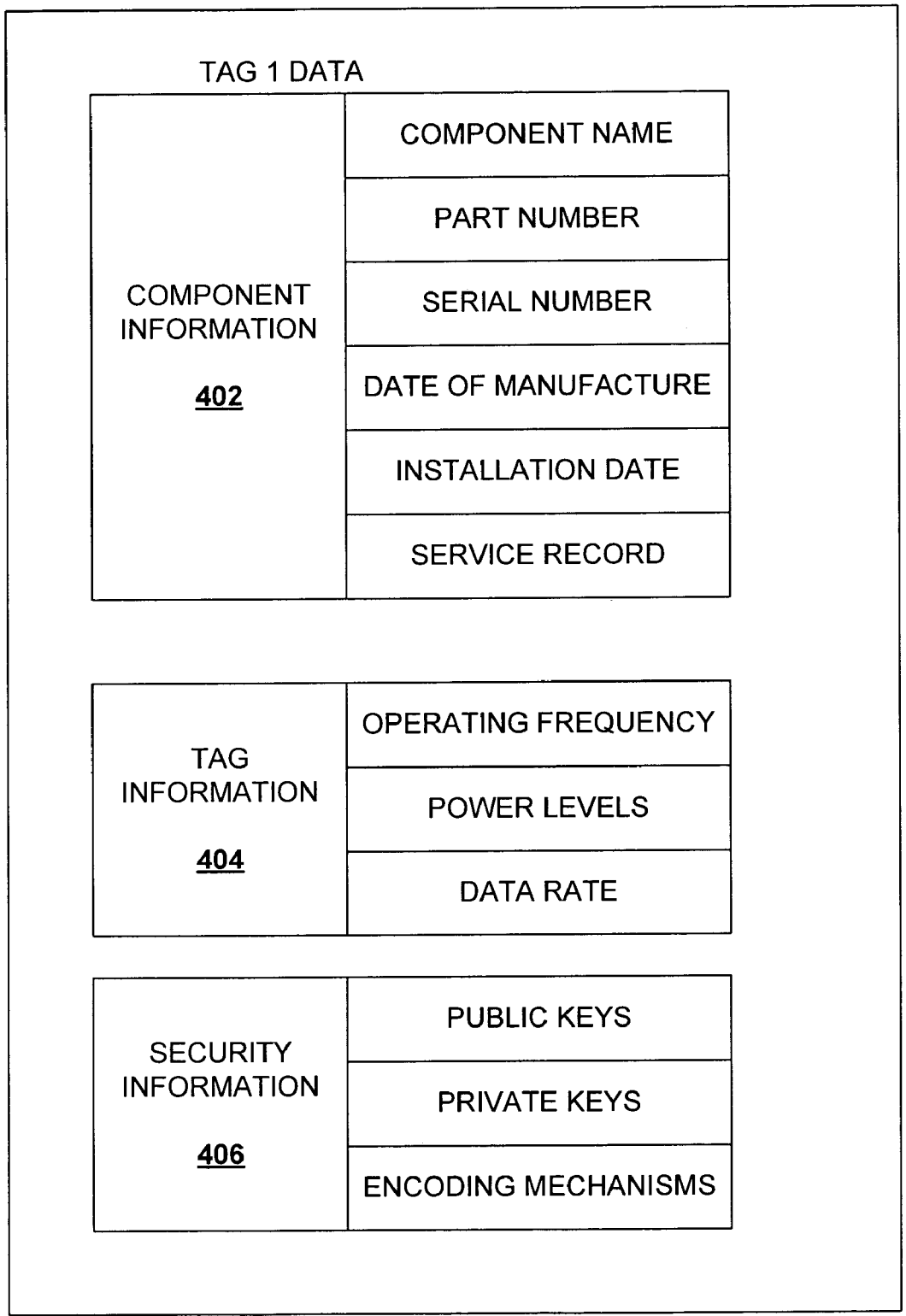
FIG. 4 is a block diagram illustrating categories of information maintained in an exemplarily tag in accordance with an aspect of the present invention.

FIG. 4 is a block diagram illustrating categories of information maintained in an exemplarily tag 400 in accordance with an aspect of the present invention. The information is typically maintained in a memory component and can be read only and/or read/write. It is noted that the information and categories shown in FIG. 4 and this description are illustrative in nature and that other information and categories can be maintained by tags in accordance with the present invention.

The tag 400, in this example, includes component information 402, tag information 404, and security information 406. The component information 402 includes information specific to an associated component, including subsystem or part. Some examples of the component information 402 are depicted as component name, part number, serial number, date of manufacture, installation date, and service record. It is appreciate that the component information can include other information about the component. The tag information 404 includes information about the tag 400 that facilitates communication between the tag 400 and one or more readers (not shown). Some examples of tag information 404 include operating frequency, power levels, data rate, and the like. The security information 406 includes information that facilitates authentication and/or secure communication between the tag 400 and one or more readers (not shown). The security information 406 can include, for example, public keys, private keys, encoding mechanisms, and the like.

Figure 5:
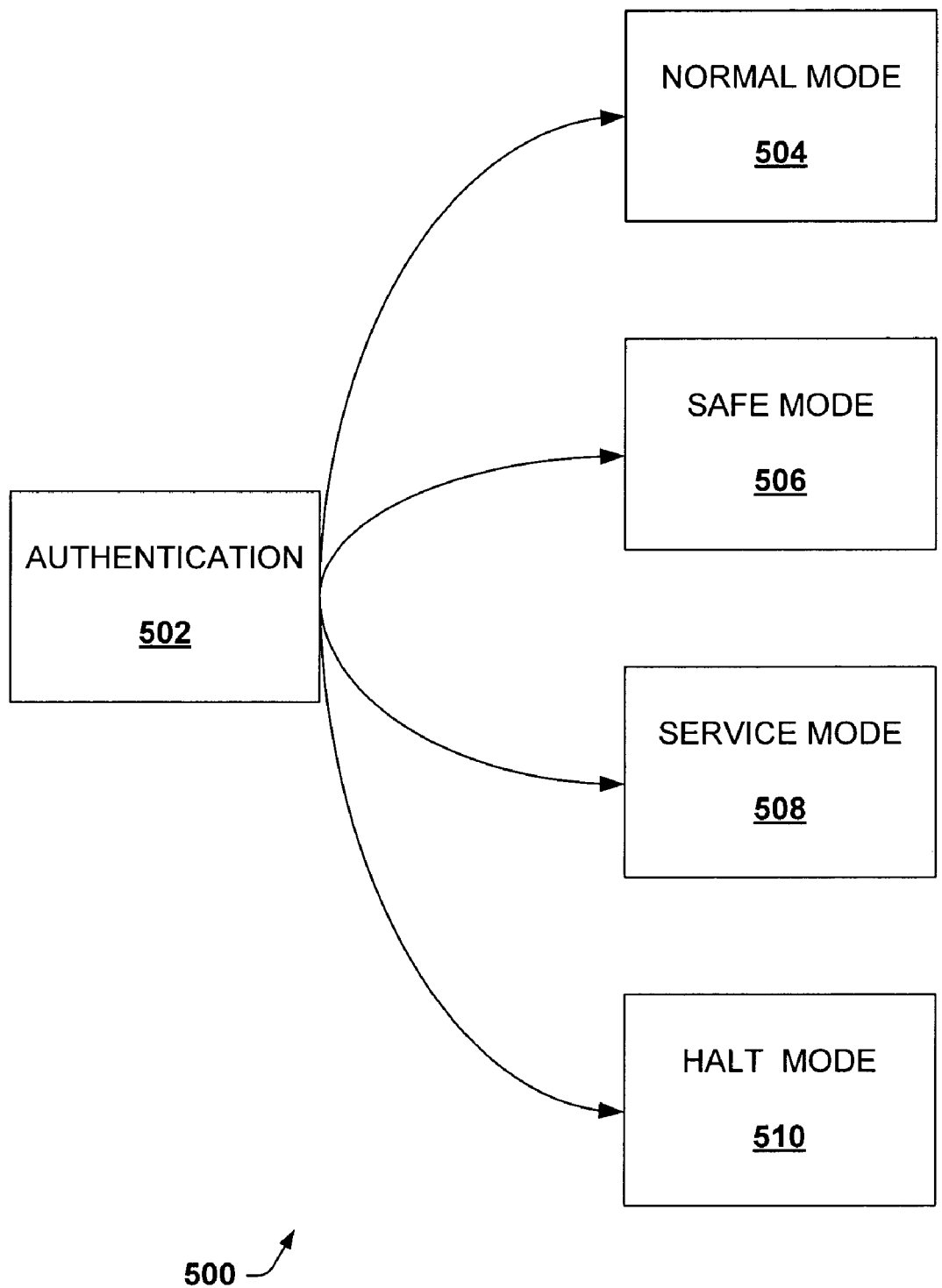
FIG. 5 is a block diagram illustrating an authentication system and modes of operation in accordance with an aspect of the present invention.

FIG. 5 is a block diagram illustrating an authentication system 500 and modes of operation in accordance with an aspect of the present invention. The system 500 can be implemented in a system such as the system 100 of FIG. 1 in the controller 110 and authenticates components and selects an appropriate mode of operation.

The authentication component 502 is not necessarily aware of components, including parts and subsystems, present. The authentication component 502 generates an encoded interrogatory signal, which is then sent to one or more RFID tags (not shown). The interrogatory signal is encoded with a mechanism for which suitable components are able to decode. Accordingly, the one or more RFID tags decode the interrogatory signal and generate an encoded response signal. The encoded response signal may include a key or other indicator specific to the system 500 that indicates that an associated component is allowed with the present system 500. The authentication component receives the encoded response signal and decodes the received response signal. Response signals that are not encoded with the proper encoding are deemed not-authenticated and improper by the authentication component. Furthermore, responses that include invalid keys and/or indicators are also deemed not-authenticated, and therefore, improper.

The authentication component 502 also obtains component identification information including part number and serial number via the RFID tags (not shown), as discussed above. The component information is compared with a list of previously installed component information, also at least comprising part number and serial number, to identify newly installed components and uninstalled components, if any.

If the components are authenticated, the authentication component 502 sets the system 500 to a normal mode of operation 504, which causes the system 500 to operate at normal parameters and operation conditions. For example, an ion implantation system in normal operation is thus permitted to perform ion implantations. If one or more of the components are not authenticated, but are still deemed compatible, the authentication component 502 sets the system to operate in a safe mode of operation 506, wherein the system 500 is permitted to operate but with limited operability. For example, an ion implantation system with a non-authenticated vacuum pump may be limited to performing only a small range of high energy ion implantations. If one or more of the components are not authenticated and deemed incompatible, the system 500 is set to a halt mode of operation 510, which causes the system 500 to halt. The halt mode of operation 510 may provide a notification identifying the non-authorized component. For example, an ion implantation system with a non-authenticated power supply can be halted to avoid damage to the system and/or devices being fabricated. The authentication component 502 can set the system 500 to a service mode of operation 508 on identifying a service condition. The service mode 508 can provide a notification that service is required, identify the service required, and prevent operation of the system 500. Some examples of possible service conditions include, but are not limited to, a component past its usage lifetime, a missing essential component, tolerance failure, and the like.

Figure 6:
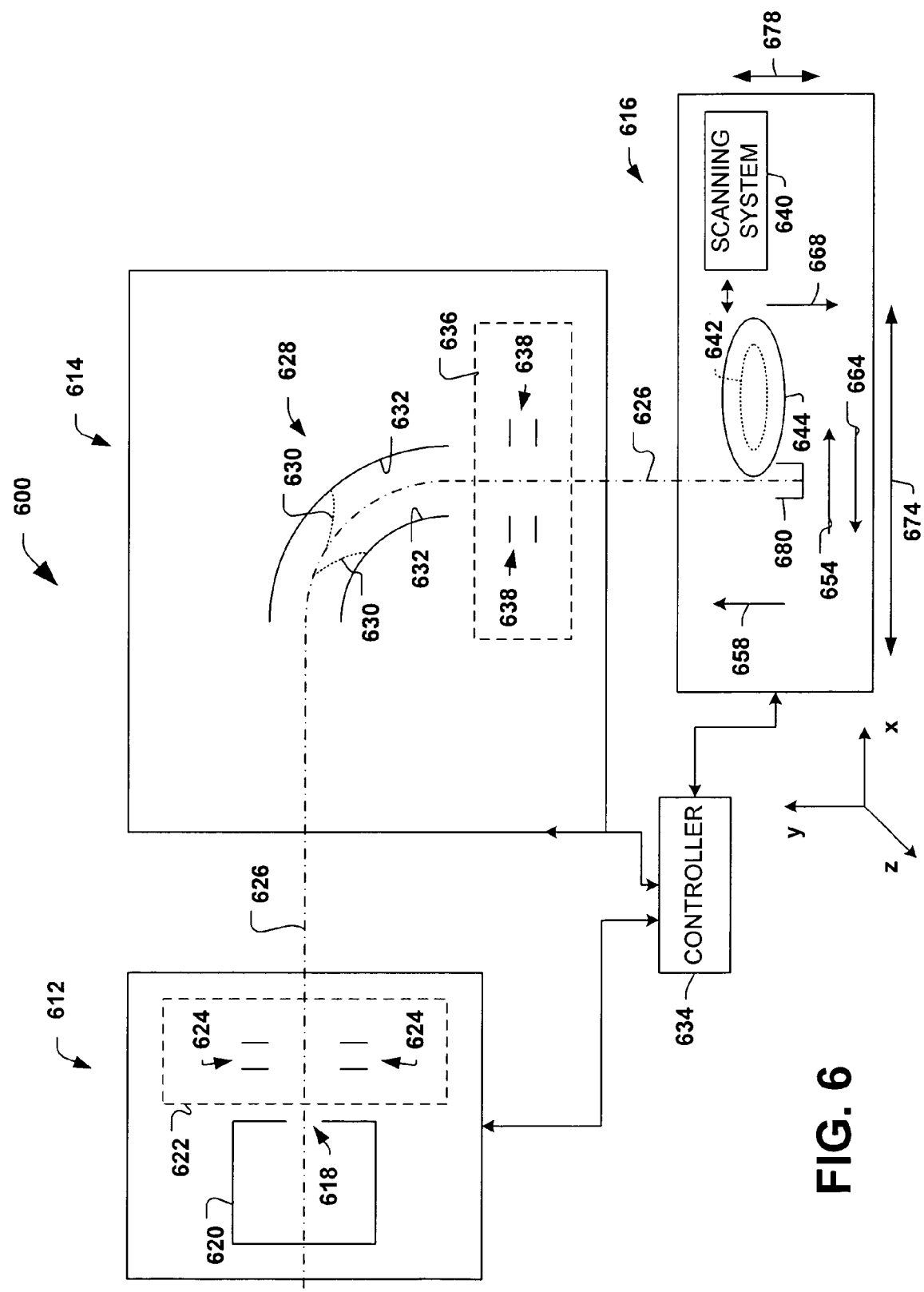
FIG. 6 illustrates an exemplary ion implantation system that includes part authentication in accordance with an aspect of the present invention.

FIG. 6 illustrates an exemplary ion implantation system 600 that includes part authentication in accordance with an aspect of the present invention. The implantation system 600 includes an ion source 612, a beamline assembly 614, and a target or end station 616. The ion source 612 comprises an ion generation chamber 620 and an ion extraction (and/or suppression) assembly 622. A (plasma) gas of a dopant material (not shown) to be ionized is located within the generation chamber 620. The dopant gas can, for example, be fed into the chamber 620 from a gas source (not shown). Energy can be imparted to the dopant gas via a power source (not shown) to facilitate generating ions within the chamber 620. It will be appreciated that the ion source 612 can also utilize any number of suitable mechanisms (none of which are shown) to excite free electrons within the ion generation chamber 620, such as RF or microwave excitation sources, electron beam injection sources, electromagnetic sources and/or a cathode which creates an arc discharge within the chamber, for example. The excited electrons collide with the dopant gas molecules in the chamber 620 and ions are thereby generated. Generally positive ions are generated, although the present invention is applicable to systems wherein negative ions are generated by the source 612. The ions are controllably extracted through a slit 618 in the chamber 620 by the ion extraction assembly 622, which comprises a plurality of extraction and/or suppression electrodes 624. It will be appreciated that the extraction assembly 622 can include, for example, an extraction power supply (now shown) to bias the extraction and/or suppression electrodes 624 to accelerate the ions from the source 612 along a trajectory leading to an ion mass analyzing magnet 628 within the beamline assembly 614.

Accordingly, the ion extraction assembly 622 functions to extract a beam 626 of ions from the plasma chamber 620 and to accelerate the extracted ions into the beamline assembly 614, and more particularly into a mass analysis magnet 628 within the beamline assembly 614. The mass analysis magnet 628 is formed at about a ninety degree angle and a magnetic field is generated therein. As the beam 626 enters the magnet 628, it is correspondingly bent by the magnetic field such that ions of an inappropriate charge-to-mass ratio are rejected. More particularly, ions having too great or too small of a charge-to-mass ratio are deflected 630 into side walls 632 of the magnet 628. In this manner, the magnet 628 only allows those ions in the beam 626 which have the desired charge-to-mass ratio to completely traverse therethrough. Control electronics or a controller 634 can be included to adjust the strength and orientation of the magnetic field, among other things. The magnetic field can, for example, be controlled by regulating the amount of electrical current running through field windings of the magnet 628. It will be appreciated that the controller 634 may include a programmable micro-controller, processor and/or other type of computing mechanism for overall control of the system 600 (e.g., by an operator, previously and/or presently acquired data and/or programs).

The beamline assembly 614 may also include an accelerator 636, for example, that comprises a plurality of electrodes 638 arranged and biased to accelerate and/or decelerate ions, as well as to focus, bend and/or decontaminate the ion beam 626. Further, it will be appreciated that ion beam collisions with other particles degrade beam integrity so that the entire beamline assembly 614 from the source 612 to the end station 616, including the mass analysis magnet 628, may be evacuated by one or more pumps (not shown). Downstream of the accelerator 636 is the end station 616 which receives the mass analyzed ion beam 626 from the beamline assembly 614. The end station 616 includes a scanning system 640 that may comprise a support or end effector 642 upon which a workpiece 644 to be treated is mounted for selective movement thereby. The end effector 642 and workpiece 644 reside in a target plane that is generally perpendicular to the direction of the ion beam 626.

According to one or more aspects of the present invention, the workpiece 644 is moved (e.g., via the end effector 642) back and forth in directions 654, 664 along a first or "fast" scan path 674 (e.g., along the x-axis) such that respective ranges of motion of the workpiece 644 along the first scan path 674 during the respective oscillations of the workpiece 644 along the first scan path 674 correspond to respective sizes of portions of the workpiece 644 being scanned during the respective oscillations. The workpiece 644 is also moved through slow scan directions 658 or 668 along a second or "slow" scan path 678 (e.g., along the y-axis) as the workpiece 644 oscillates along the first scan path 674. In this manner, a scan pattern produced thereby approximates the shape of the workpiece 644. By way of example, in the system 600 illustrated in FIG. 6, the workpiece 644 has just completed a fast scan in direction 654, and is thus ready to be moved back through fast scan direction 664 (e.g., once the workpiece 644 has been indexed along the slow scan path 678).

The respective ranges of motion of the workpiece 644 along the first scan path 674 may be a function of the orientation of the workpiece 644 relative to the ion beam 626 as well as the size, shape and/or other dimensional data of the workpiece 644 and/or the ion beam, for example. The controller 634 may, for example, utilize such orientation data and dimensional data to control the selective movement of the workpiece 644. For example, the respective ranges of motion of the workpiece 644 along the fast scan path 674 may be controlled (e.g., by the controller 634) to slightly exceed the respective sizes of the portions of the workpiece 644 being scanned during the respective oscillations so that the workpiece 644 is not impinged upon by the ion beam while the workpiece is changing directions and/or moving along the second scan path 678. In this manner, respective overshoots can be said to exist for the different oscillations. Such overshoots can, for example, be made large enough to accommodate inertial effects that are inevitable when the workpiece 644 changes direction and/or velocity.

Accommodating such inertial effects "outside of" where the workpiece 644 intersects the ion beam 626 facilitates a more uniform ion implantation since the workpiece 644 is resultantly moving at a more constant velocity when it actually passes through the ion beam 626. Additionally, the end of a scan can, for example, be ascertained and/or anticipated by tracking (e.g., with the controller 634) the relative position of the workpiece 644 to the ion beam 626 (e.g., by knowing an initial orientation of the workpiece 644 to the ion beam 626, knowing the dimensions of the workpiece and/or ion beam and tracking the movements of the workpiece 644 (e.g., via the end effector 642) so as to maintain a constant "watch" over the relative position of the workpiece 644 to the beam 626). The workpiece 644 can thereafter be moved in the opposite direction back along fast scan path 674 once inertial effects have been accommodated.

A measurement component 680 (e.g., a Faraday cup) may also be incorporated into the end station 616. The measurement component 680 may be operative to detect beam current, for example, and may be situated behind the workpiece 644 (e.g., so as to not interfere with the ion implantation process). A detected level of beam current can, for example, be utilized to identify the end of a scan. For example, when the measurement component 680 detects a full intensity of the ion beam 626, it may provide the controller 634 with a signal indicating that the workpiece 644 has just completed a pass through the ion beam 626. Knowing the speed of the workpiece 644 and/or the incremental distance that the workpiece 644 has to travel along the second scan path 678, for example, the controller 634 can regulate the duration of respective overshoots to accommodate inertial effects. Similarly, one or more adjustments to the movement of the workpiece 644 can be made should the workpiece 644 begin to move back into the ion beam too quickly (e.g., where the workpiece is still being moved along the second scan path 678). In this instance, the measurement component may, for example, detect beam current sooner than expected. Such a situation could result in a perimeter or edge portion of the workpiece 644 becoming too heavily doped, for example. Further, the entire workpiece can be deemed to have passed through the ion beam and been implanted with ions when a full intensity of the ion beam continues to be detected by the measurement component 680 as the workpiece is oscillated back along the first scan path (e.g., indicating that the workpiece 644 has completely transitioned through the slow scan path 678).

It will be appreciated that the measurement component 680 can also be utilized to "map" ion implantation. For example, a Faraday cup can be substituted for the workpiece 680 during a test run. The Faraday cup can then be moved relative to the ion beam 626 while the beam current is held constant. In this manner, variations in ion dosage can be detected. A waveform or map of beam current intensity versus scan position can thus be identified (e.g., by feeding the readings taken by the cup back to the controller 634). The detected waveform(s) can then be utilized to adjust the beam current during actual implantation. Further, a source of plasma (not shown) may also be included in the end station 616 to bathe the beam 626 in neutralizing plasma to mitigate the number of positive charges that would otherwise accumulate on a target workpiece 644. A plasma shower would, for example, neutralize charges that would otherwise accumulate on a target workpiece 644 as a result of being implanted by the charged ion beam 626.

Some or all of the components of the system 600 have RFID tags (not shown) associated therewith. Additionally, one or more readers (not shown) are present and connected to the controller 634. The RFID tags include at least part number and serial number and may include other information including security information. For example, the ion source 612, the beamline assembly 614, the end station 616, the ion generation chamber 620, the ion extraction assembly 622, the extraction and/or suppression electrodes 624, the extraction power supply, the mass analysis magnet 628, the accelerator 636, the plurality of electrodes 638, the one or more pumps (not shown), the scanning system 640, the end effector 642, and the measurement component 630 can have RFID tags associated therewith.

On startup or initialization of the system 600, the controller 634 sends one or more interrogatory signals via the readers requesting identification and authentication from the RFID tags. The controller 642 may not have knowledge of components and the tags present within the system. The tags respond with signals that include component information, tag information, and authentication information. The controller 642 then determines components within the system, determines if components have been uninstalled from the system 600, and determines if components have been installed to the system 600 and stores this information. Additionally, the controller 642 analyzes the authentication information to authenticate the components. The controller 642 can send signals to the tags updating their component information with, for example, usage updates, dates installed, and the like.

If one or more of the components are not authenticated, the controller 642 can either halt operation or operate in a limited, safe mode, such as described in FIG. 5. Otherwise, the controller 642 operates the system 600 in normal mode, wherein the controller 642 periodically polls the tags to reaffirm their presence and operation within the system 600. If an error is identified, the controller 642 can perform corrective action including shutting down the system, operating in a limited capacity, requesting service and/or replacement of affected components, and the like. During termination mode, the controller 642 sends interrogatory signals that include updated component information, such as usage information. Other special modes, including programming modes, can also be present and employed within the system 600 in accordance with the present invention.

In view of the foregoing system, structural, and functional features described supra, methodologies in accordance with various aspects of the present invention will be better appreciated with reference to the above FIGS. and descriptions. While, for purposes of simplicity of explanation, the methodologies described below are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Figure 7:
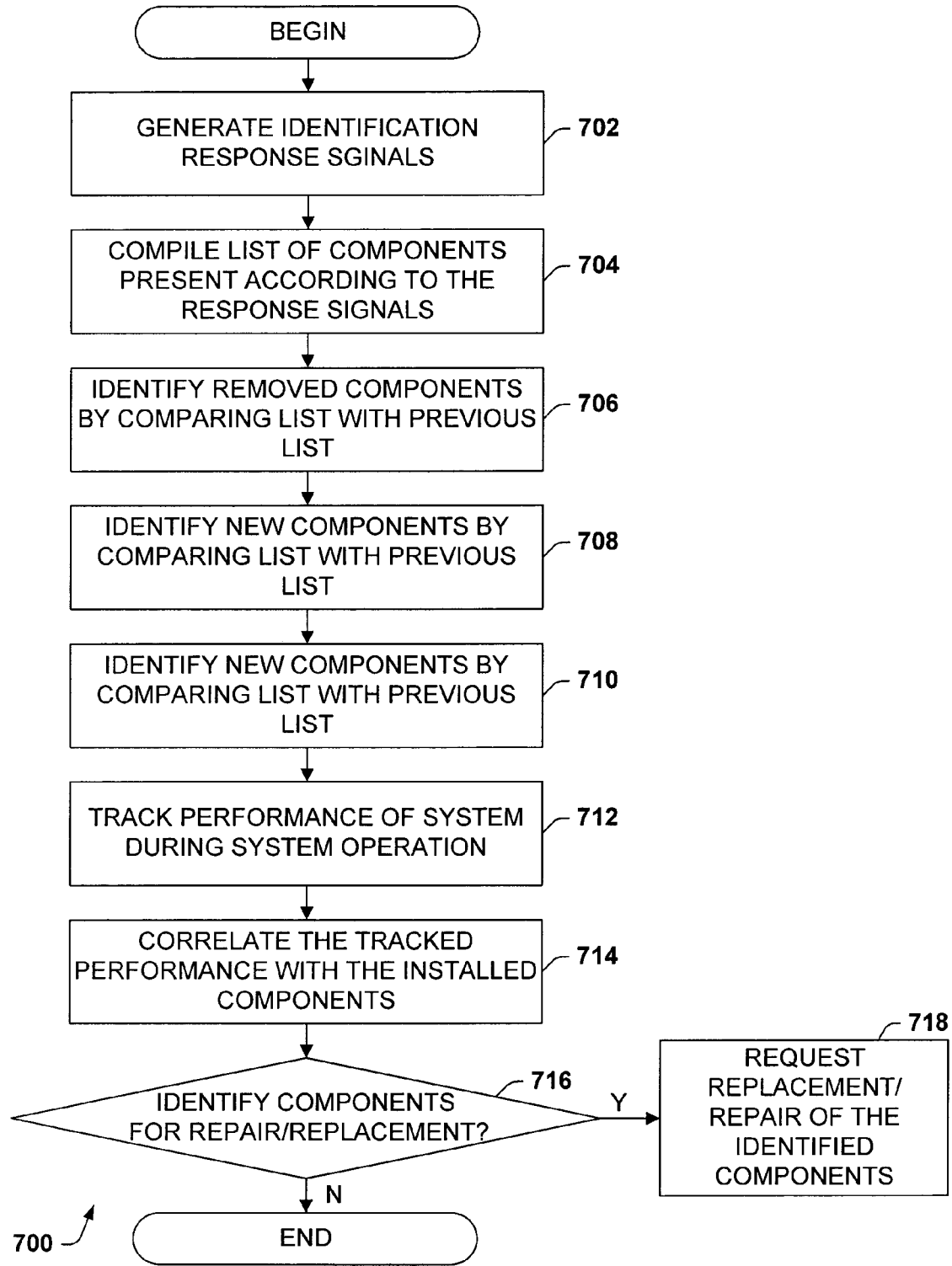
FIG. 7 is a flow diagram illustrating a method of managing components, including parts and subsystems, within a system in accordance with an aspect of the present invention.

FIG. 7 is a flow diagram illustrating a method 700 of managing components, including parts and subsystems, within a system in accordance with an aspect of the present invention. The method 700 identifies components installed, uninstalled, and remaining within the system. Additionally, the method 700 correlates performance of the system with the identified components to determine if replacement and/or repair of one or more components is desired. The system 700 generally performs a task or operation and comprises a number of components, including parts and/or subsystems. An example of a suitable system is an ion implantation system, such as the system described in FIG. 6.

The method 700 begins at block 702, wherein an identification request signal is generated. The identification signal is readable or interpretable by one or more RFID tags present within a system. The one or more tags are associated with components in the system. One or more readers typically transmit the identification request signal to the one or more tags via a wireless communication medium.

Identification response signals are generated by the one or more tags at block 704. The identification response signals include at least part number and serial number for an associated component, including part and/or subsystem. The identification response signals can also include other component information as well as tag information. The identification response signals are generated by the one or more tags and transmitted to the one or more readers via the wireless communication medium.

A list of components present within the system are generated and/or compiled according to the generated response signals at block 706. The list of components includes information for each component including part number, serial number, and the like. The list of components present can also include information such as date installed, component lifetime, and the like.

Removed components are identified by comparing the list of components with a previous list of components at block 708. The remove components can be identified by finding components present in the previous list of components, but not present in the current list of components. New components are also identified by comparing the list of components with the previous list of components. The new components can be identified by finding components present in the current list of components that are not present in the previous list of components. It is noted that other information can be obtained by comparing the current list of components with the previous list of components.

Performance of the system is tracked during normal system operation at block 712. For example, performance of ion implantations can be tracked for an ion implantation system. The tracked performance is correlated with the list of present components at block 714. Components that are negatively impacting performance are identified at 716. As an example, tracked performance for an ion implantation system could indicate large numbers of foreign particles being present within an ion beam. This tracked performance could be correlated with the present components to identify a faulty vacuum pump.

If identified, repair and/or replacement of the identified faulty components is requested at block 718. The request can be performed in a number of suitable ways, such as, for example, providing a visual notification to a system operator, adding an entry to a log file, notifying a system operator via a wired and/or wireless communication, notifying the manufacture of the identified faulty component via a network medium.

Figure 8:
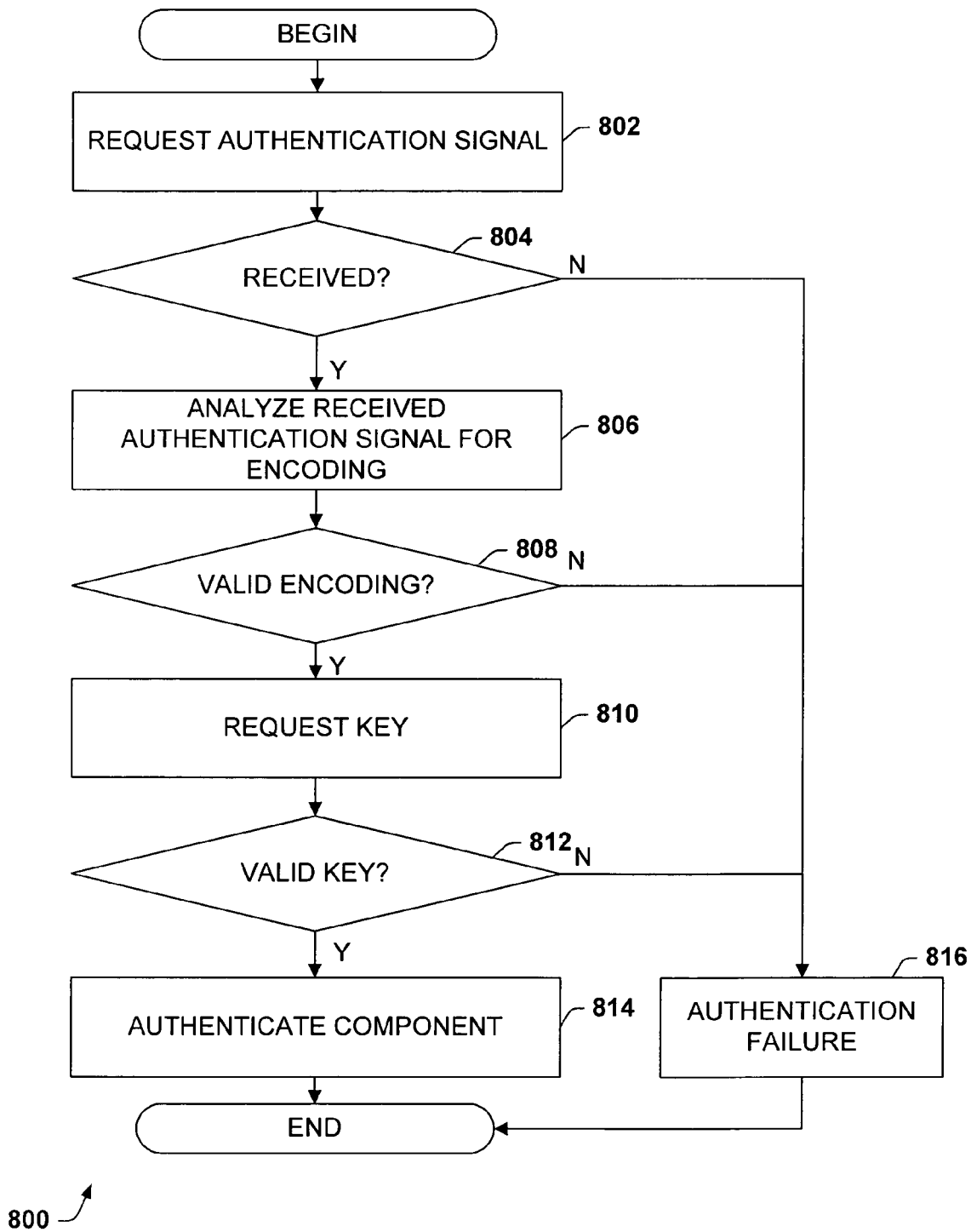
FIG. 8 is a flow diagram illustrating a method of authenticating a component via RFID tags in accordance with an aspect of the present invention.

FIG. 8 is a flow diagram illustrating a method 800 of authenticating a component via RFID tags in accordance with an aspect of the present invention. The method 800 operates with respect to a single component and its associated RFID tag, however the method 800 can be repeated for any number of components present within a system.

Beginning at block 802, a request authentication signal is generated. The request authentication signal requests authentication from a component present within the system and, typically within range of one or more readers and is typically generated by a system controller via one or more readers. If an authentication signal is not received at block 804, the method 800 proceeds to block 816 wherein the component is deemed non-authenticated.

Otherwise, if an authentication signal is received at block 804, the method 800 continues to block 806 wherein the received authentication signal is analyzed for encoding. The signal can be analyzed by applying one or more decoding algorithms designated for use within the system. If the encoding is not valid at block 808, the method proceeds to block 816 where the component is deemed non-authenticated.

Otherwise, if the encoding is valid at block 808, the method proceeds to block 810 where a key is requested from the RFID tag. The key is a unique identifier for the component and/or manufacturer of the component. If the key is not valid, as determined at block 812, the method 800 proceeds to block 816 where the component is deemed non-authenticated. Other suitable authentication mechanisms can also be employed.

If the key is valid, as determined at block 812, the method 800 proceeds to block 814 wherein the component is deemed authenticated. Additional authentication information may be provided by the RFID tag. Secure encrypted communication may be set up between the component and the one or more readers.

As stated above, the method 800 can be repeated for multiple components within a system. Additionally, more than one component's RFID tag may respond to a single request authentication signal.

Figure 9:
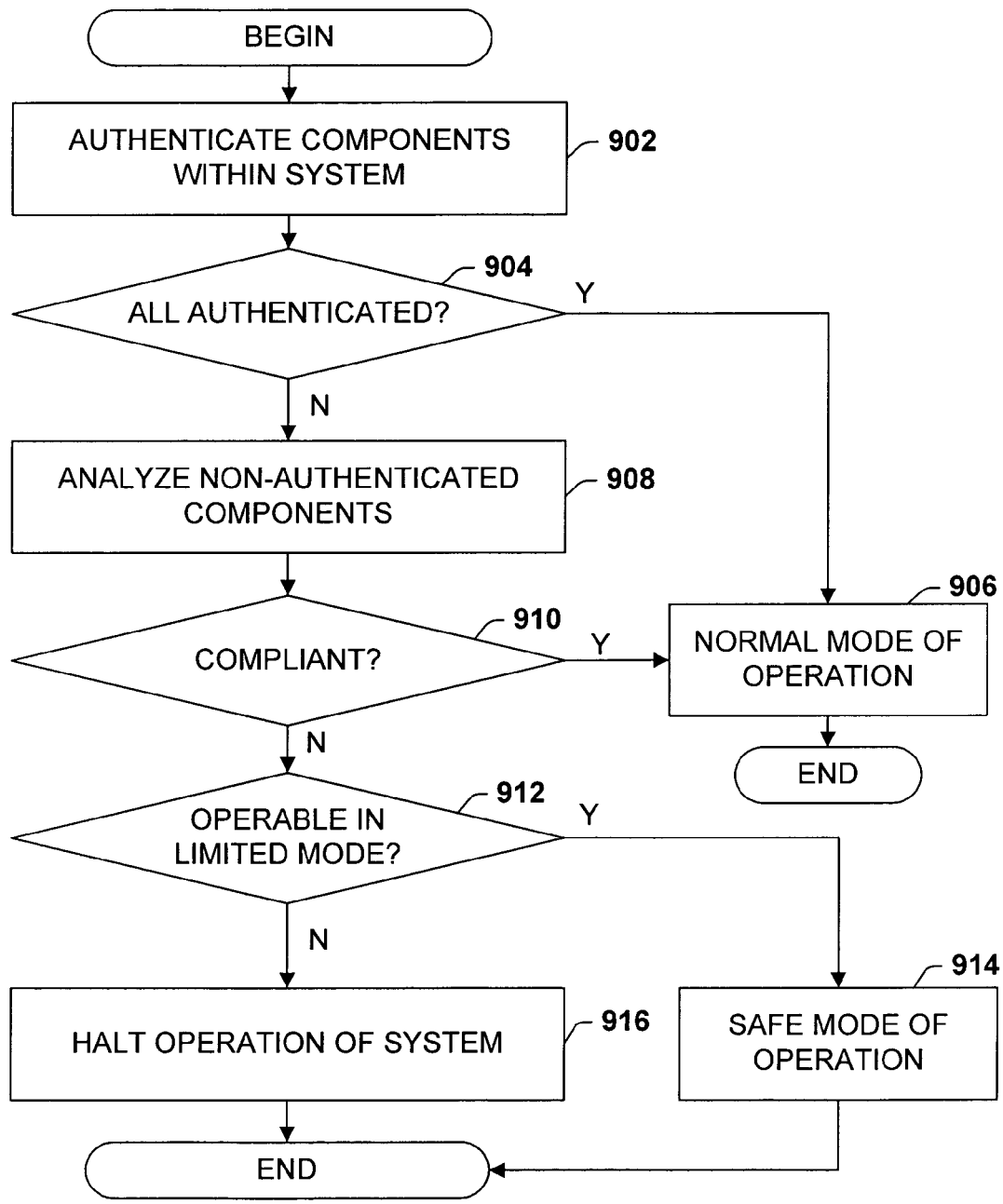
FIG. 9 is a flow diagram illustrating a method of authenticating components, including parts and subsystems, within a system and selects a mode of operation according to the authentication.

FIG. 9 is a flow diagram illustrating a method 900 of authenticating components, including parts and subsystems, within a system and selects a mode of operation according to the authentication. The method 900 generates initial interrogatory signals, one or more tags respond with authentication information, and a mode of operation is selected according to the authentication information obtained.

The method 900 begins at block 902 wherein components within a system are authenticated via RFID tags. The system is generally operable to perform fabrication of devices, run tests, and the like. An exemplary system is an ion implantation system. The components can be identified as described above, for example the method 800 of FIG. 8. If the components are authenticated at block 904, the method 900 proceeds to block 906 wherein the system enters a normal mode of operation. As an example, for an ion implantation system the normal mode of operation would permit performing ion implantations capable by the system.

If one or more of the components are not authenticated at block 904, the non-authenticated components are analyzed at block 908 with regard to compliance with the system. The components can be analyzed, for example, to determine if the non-authenticated components have suitable characteristics, including performance characteristics, to properly operate within the system. For example, a non-authenticated vacuum pump may be underpowered and not create a proper near vacuum environment for travel of an ion beam in an ion implantation system. Such a non-authenticated pump would be considered non-compliant. It is appreciated that the present invention contemplates varying standards for compliance including deeming all non-authenticated components as non-compliant.

If the one or more components are deemed compliant at 910, the method 900 proceeds to block 906 wherein the system enters the normal mode of operation. Otherwise the method 900 proceeds to block 912, wherein it is determined whether the non-compliant components can allow system operation in a limited capacity. If the non-compliant components permit operation of the system in a limited capacity, the method 900 proceeds to block 914 wherein the system operates in a safe mode. The safe mode of operation allows the system to perform a limited or subset of its normal functions. For example, an ion implantation system operating in safe mode could be limited to high energy zero angle implants. The safe mode at block 914 can also request repair and/or service for the system regarding the identified non authorized and/or non-compliant components.

If the system is determined to be not operable in a limited mode at block 912, operation of the system is halted at block 916. So doing can prevent damage to the system and other components within the system. Additionally, halting operation can prevent erroneous and/or damaging performance of the system. For example, the halting of operation can prevent an ion implantation system from damaging partially fabricated semiconductor devices due to the non-compliant components. Prior to halting operation, a request for repair and/or service may be generated regarding the identified non-authorized and/or non-compliant components.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. An ion implantation system comprising:
   one or more components of the system;
   one or more RFID tags individually associated with the one or more components, wherein the RFID tags include at least a part number and a serial number for the one or more components;
   one or more tag readers that employ a wireless communication mechanism to communicate with the one or more RFID tags; and
   a controller coupled to the tag readers that generates interrogatory signals, receives response signals from the one or more RFID tags, obtains authentication information from the received signals and selects a mode of operation for the system from a normal mode and a safe mode according to the obtained authentication information.

2. The ion implantation system of claim 1, wherein the wireless communication mechanism comprises inductive coupling.

3. The ion implantation system of claim 1, wherein the wireless communication mechanism comprises propagating electromagnetic waves.

4. The ion implantation system of claim 1, wherein the one or more components comprise a chamber pump.

5. The ion implantation system of claim 1, wherein the one or more components comprise a mass analyzer.

6. The ion implantation system of claim 1, wherein the one or more components comprise a linear accelerator.

7. The ion implantation system of claim 1, wherein the RFID tags comprise read only memory.

8. The ion implantation system of claim 1, wherein the RFID tags comprise read/writable memory.

9. The ion implantation system of claim 1, wherein the RFID tags comprise data buffers to temporarily hold incoming data following demodulation and outgoing data for modulation.

10. The ion implantation system of claim 1, wherein the RFID tags are active and have power source allowing active operation.

11. The ion implantation system of claim 1, wherein the controller tracks component usage information and provides the usage information to the one or more RFID tags via the interrogatory signals.

12. The ion implantation system of claim 1, wherein the received signals comprise component information, tag information, and/or security information.

13. The ion implantation system of claim 12, wherein the component information includes the part number, the serial number, date of manufacture, installation date, and service record.

14. The ion implantation system of claim 12, wherein the tag information includes operating frequency and data rate.

15. The ion implantation system of claim 12, wherein the security information includes encoding mechanisms, public keys, and/or private keys.

16. A method of selecting modes of operation comprising:
    authenticating components within a system via RFID tags associated with the components;
    analyzing non-authenticated components for compliance with system operational parameters;
    analyzing non-authenticated and non-compliant components for operation of the system in a limited capacity;
    operating in a safe mode on the non-authenticated and non compliant components being operable in the limited capacity; and
    operating in a normal mode on the non-authenticated components being compliant.

17. The method of claim 16, further comprising halting operation on the non-authenticated and non-compliant components being inoperable in a limited capacity.

18. The method of claim 16, wherein operating in the safe mode comprises operating with a subset of functions available in the normal mode.

* * * * *